US007830899B2

(12) United States Patent
Duan et al.

(10) Patent No.: US 7,830,899 B2
(45) Date of Patent: Nov. 9, 2010

(54) OBTAINING CHANNEL STATUS IN A NETWORK-BASED DATA TRANSPORT ARCHITECTURE

(75) Inventors: Cheng Gang Duan, Shanghai (CN); Lin Hua, Shanghai (CN); Tao Wang, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 1372 days.

(21) Appl. No.: 11/140,428

(22) Filed: May 27, 2005

(65) Prior Publication Data
US 2006/0268730 A1    Nov. 30, 2006

(51) Int. Cl.
*H04L 12/28* (2006.01)
*H04J 3/04* (2006.01)

(52) U.S. Cl. ...................... 370/412; 370/535
(58) Field of Classification Search ........... 370/419, 370/428, 410, 412, 413, 395.1, 328, 329, 370/336; 455/557, 556, 466, 452.2, 448, 455/440, 436
See application file for complete search history.

(56) References Cited

U.S. PATENT DOCUMENTS

| 5,142,529 | A | * | 8/1992 | Parruck et al. ............... 370/545 |
| 5,621,383 | A | * | 4/1997 | Yoshiyama ................. 340/506 |
| 5,794,160 | A | * | 8/1998 | Ezuriko ....................... 455/557 |
| 6,122,514 | A | * | 9/2000 | Spaur et al. .................. 455/448 |
| 6,223,043 | B1 | * | 4/2001 | Hazama ....................... 455/455 |
| 6,366,556 | B1 | * | 4/2002 | Ballintine et al. ............ 370/216 |
| 6,549,472 | B2 | * | 4/2003 | Bondurant ............. 365/189.19 |
| 6,594,237 | B1 | * | 7/2003 | Kiuchi et al. ................ 370/250 |
| 6,834,059 | B2 | * | 12/2004 | Kibe .......................... 370/517 |
| 6,965,565 | B1 | * | 11/2005 | Duclos ........................ 370/235 |
| 7,079,847 | B2 | * | 7/2006 | Blair et al. ................ 455/452.2 |
| 7,107,021 | B2 | * | 9/2006 | Kim et al. .................... 455/101 |
| 2004/0111536 | A1 | * | 6/2004 | Ellerbrock et al. ........... 709/250 |
| 2005/0147106 | A1 | * | 7/2005 | Sonoda ................... 370/395.51 |

OTHER PUBLICATIONS

H. Lin et al., "Traffic Groomin in WDM SONET UPSR Rings with Multiple Line Speeds," Stanford University Publication, 12 pages, 2004.

* cited by examiner

*Primary Examiner*—Hanh Nguyen
(74) *Attorney, Agent, or Firm*—Ryan, Mason & Lewis, LLP

(57) ABSTRACT

A buffer circuit for use in a node in a network-based data transport system is configurable for providing channel status information of all channels associated with a given signal in the network-based data transport system. The buffer circuit includes a memory and a controller coupled to the memory. The controller is operative: (i) to receive channel status information from a plurality of different channel status sources; (ii) to select one of the channel status sources for supplying the channel status information at a given point in time; and (iii) to store the channel status information corresponding to the selected channel status source in the memory.

23 Claims, 4 Drawing Sheets

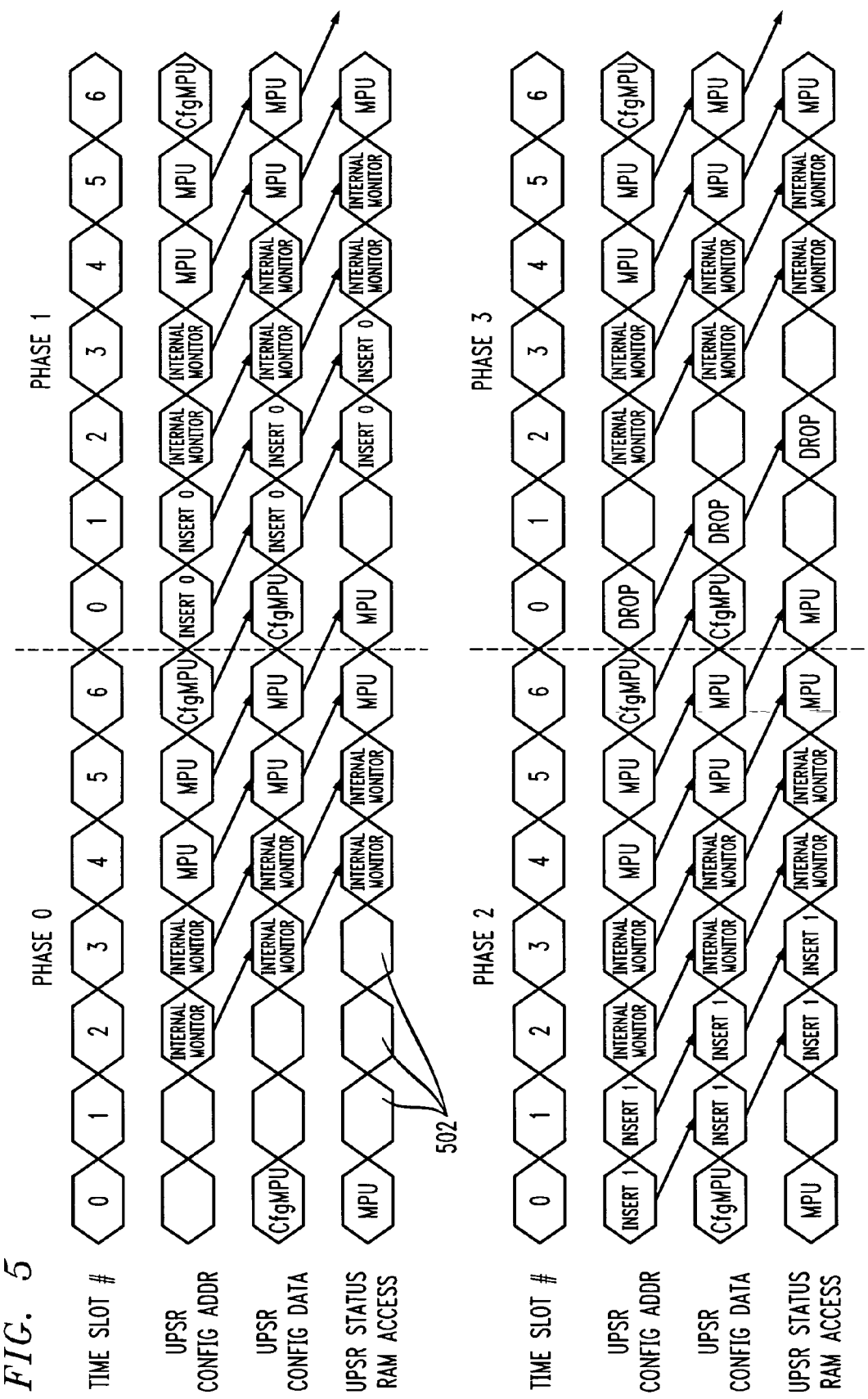

OBTAINING CHANNEL STATUS IN A NETWORK-BASED DATA TRANSPORT ARCHITECTURE

FIELD OF THE INVENTION

The present invention relates generally to communication networks, and more particularly relates to techniques for obtaining channel status of substantially all channels associated with a given signal in a network-based data transport architecture.

BACKGROUND OF THE INVENTION

In a network-based communications environment, a communications standard, such as, for example, synchronous optical network (SONET), may be employed for supplying connectivity between a plurality of nodes in the network. SONET is a well-known standard for optical telecommunications transport promulgated by the Exchange Carriers Standards Association (ECSA) for the American National Standards Institute (ANSI). The SONET standard is set forth in the document ANSI T1.105-1988, entitled "American National Standard for Telecommunications—Digital Hierarchy Optical Interface Rates and Formats Specification" (September 1988), which is incorporated by reference herein. Additional supplements to the SONET standard, including ANSI T1.105.01-2000, entitled "Synchronous Optical Network (SONET)—Automatic Protection Switching" (2000), are also incorporated by reference herein.

A SONET is commonly implemented as a ring architecture, such as, for example, a Unidirectional Path Switched Ring (UPSR). An illustrative UPSR 100 is shown in FIG. 1. A ring, unlike a linear add/drop chain, is generally defined as a set of nodes 102 interconnected by optical fiber links 104, 106 to form a closed loop. A node 102 in the SONET context typically comprises an add/drop multiplexer (ADM) configured to allow signals to be added into or dropped from a transported data frame. In the UPSR, data traffic is always routed in one direction (e.g., counterclockwise). The UPSR provides redundant bandwidth to protect services against node failures, or other failure conditions, for improved transport survivability (e.g., self-healing) via SONET path selection.

The basic building block in a SONET is a synchronous transport signal level-1 (STS-1*e*) frame. The STS-1 frame is transported at a 51.840 Megabits per second (Mbps) serial transmission rate using an optical carrier level-1 (OC-1) optical signal. The basic frame rate in a SONET is 8,000 frames per second, but the bit rate will depend on the frame format used. Higher-rate signals are formed by combining multiple STS-1 frames, typically by interleaving a byte from each STS-1 frame. For example, to form an STS-48 frame format, 48 STS-1 frames are multiplexed together. The basic STS-48 frame rate remains at 8,000 frames per second, but the data capacity will be 48 times greater than an STS-1 frame. The STS-48 may then be converted to an optical carrier signal (OC-48) for transport, or further multiplexed to form higher capacity channels.

The STS-1 frame structure is organized as nine rows by ninety columns of bytes, for a total frame capacity of 810 bytes. A transport overhead (TOH) portion occupies the first three columns of the STS-1 frame, and the remaining 87 columns form a synchronous payload envelope (SPE). The TOH portion of the STS-1 frame dedicates the first three rows for section overhead (SOH) and the remaining six rows for line overhead (LOH). SOH bytes are used primarily for framing, section error monitoring, and section level equipment communications. The LOH bytes are used to provide information relating to line protection and maintenance. LOH bytes are typically created and used by line terminating equipment (LTE), such as, for example, ADMs. The SPE contains one column dedicated to path overhead (POH), leaving the remaining 86 columns for payload data (49.536 Mbps). Four different size payloads called virtual tributaries (VT) fit into the SPE of the STS-1 frame. These are: VT1.5, which is 1.728 Mbps; VT2, which is 2.304 Mbps; VT3, which is 3.456 Mbps; and VT6, which is 6.912 Mbps. Each VT requires a 500 microsecond (μs) structure (e.g., four STS-1 frames) for transmission.

Each layer in the SONET signal provides alarm and error monitoring capabilities between various terminating points in the network. In a VT level of the UPSR, one OC-48 signal may contain a maximum of 1,344 channels. UPSR status information is conventionally generated by internal POH monitors. If a status of all channels associated with a given signal (e.g., OC-48) is required, all channels must be monitored, which is difficult and costly to implement in a single integrated circuit (IC) device. In a device capable of providing the status of all channels using traditional means, a significant portion of the hardware necessary for monitoring all of the channels may be undesirably wasted, since in many applications not all channels need to be monitored. Likewise, in a device capable of monitoring only a subset of the total number of channels, the device may not be fully functional in certain applications in which the status of all channels is required.

Accordingly, there exists a need for improved techniques for providing a status of all channels associated with a given signal in a network-based data transport system that does not suffer from one or more of the problems exhibited by conventional methodologies.

SUMMARY OF THE INVENTION

The present invention meets the above-noted need by providing, in an illustrative embodiment, a cost-effective mechanism for obtaining UPSR status information of all channels associated with a given signal in a SONET data transport architecture. UPSR status information can be obtained from a plurality of status sources, both internal and external to a SONET node in which the buffer circuit may be implemented. For example, the buffer circuit may be operative to receive UPSR status information from not only internal POH monitors, but rather from a plurality of sources, including, for example, one or more external field programmable gate arrays (FPGA), a microprocessor unit (MPU) interface, etc. In this manner, the complexity of the hardware and/or software required for transporting data through the UPSR can be significantly reduced, thereby providing a beneficial cost savings.

In accordance with one aspect of the invention, a buffer circuit for use in a node in a network-based data transport system is configurable for providing channel status information of all channels associated with a given signal in the network-based data transport system. The buffer circuit includes a memory and a controller coupled to the memory. The controller is operative: (i) to receive channel status information from a plurality of different channel status sources; (ii) to select one of the channel status sources for supplying the channel status information at a given point in time; and (iii) to store the channel status information corresponding to the selected channel status source in the memory.

In accordance with another aspect of the invention, an integrated circuit includes at least one buffer circuit configurable for providing channel status information of substantially all channels associated with a given signal in a network-based data transport system. The at least one buffer circuit includes a memory and a controller coupled to the memory. The controller is operative: (i) to receive channel status information from a plurality of different channel status sources; (ii) to select one of the channel status sources for supplying the channel status information at a given point in time; and (iii) to store the channel status information corresponding to the selected channel status source in the memory.

In accordance with yet another aspect of the invention, a network-based data transport system node includes at least one buffer circuit configurable for providing channel status information of substantially all channels associated with a given signal in a network-based data transport system. The at least one buffer circuit includes a memory and a controller coupled to the memory. The controller is operative: (i) to receive channel status information from a plurality of different channel status sources; (ii) to select one of the channel status sources for supplying the channel status information at a given point in time; and (iii) to store the channel status information corresponding to the selected channel status source in the memory.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 is a logic timing diagram depicting an exemplary four-phase timing methodology used by the buffer circuit of FIG. 2 for supplying UPSR status of all channels from a plurality of different status sources, in accordance with one embodiment of the present invention.

DETAILED DESCRIPTION OF THE INVENTION

The present invention will be described herein in the context of an illustrative buffer circuit for obtaining UPSR status of substantially all channels associated with a given signal in a SONET-based data transport system. It should be understood, however, that the present invention is not limited to this or any particular circuit arrangement. Rather, the invention is more generally applicable to techniques for obtaining channel status information of substantially all channels (e.g., all active channels) associated with a given signal in a network-based environment, without the need for extensive hardware typically required to monitor all of the channels. While reference is made herein to a SONET UPSR implementation, the techniques of the present invention are not limited to this specific network configuration and/or network protocol, but rather may be similarly employed with other types of network architectures and/or network-based communication protocols, as will become apparent to those skilled in the art.

The term "channel" as used herein is intended to include a wireless communication link, such as, for example, cellular, radio frequency (RF), microwave, satellite, etc., and may also include a dedicated communication line, such as, for example, telephone, cable, fiber optic, etc. In a data transport environment, a channel may have a certain data rate associated therewith which determines how many samples per second can be transmitted on that particular media. Lower rate channels can be aggregated into a single higher rate channel by using, for example, multiplexers, as understood by those skilled in the art. Likewise, lower rate channels can be extracted from a higher rate channel by using, for example, demultiplexers.

As previously stated, in a VT level of the SONET UPSR, one OC-48 signal may contain up to 1,344 channels. An OC-192 signal may contain up to 5,376 channels. Monitoring the UPSR status of all channels can therefore be a burdensome task. UPSR status information is conventionally generated by internal POH monitors in a given SONET UPSR node (e.g., ADM), such as in an Ultramapper TMXF84622 device, commercially available from Agere Systems, Inc. If a status of all channels is required, appropriate hardware must be present in the given node of the UPSR for monitoring all channels, which is difficult and costly to implement in a single IC device. In providing the status of all channels using traditional means, a significant portion of the hardware necessary for monitoring all of the channels may be undesirably wasted, since in many applications it may not be necessary to monitor all channels. Likewise, in a device capable of monitoring only a subset of the total number of channels, the device may not be fully functional in certain applications in which the status of all channels is required.

Figure 1:
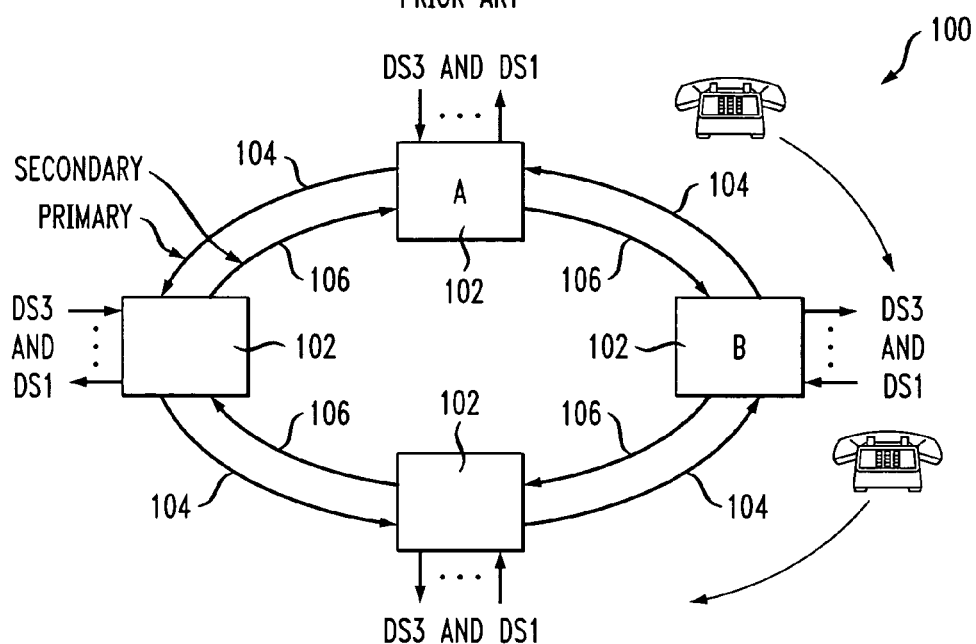
FIG. 1 is a block diagram depicting an illustrative SONET UPSR in which the methodologies of the present invention may be employed.
Figure 3:
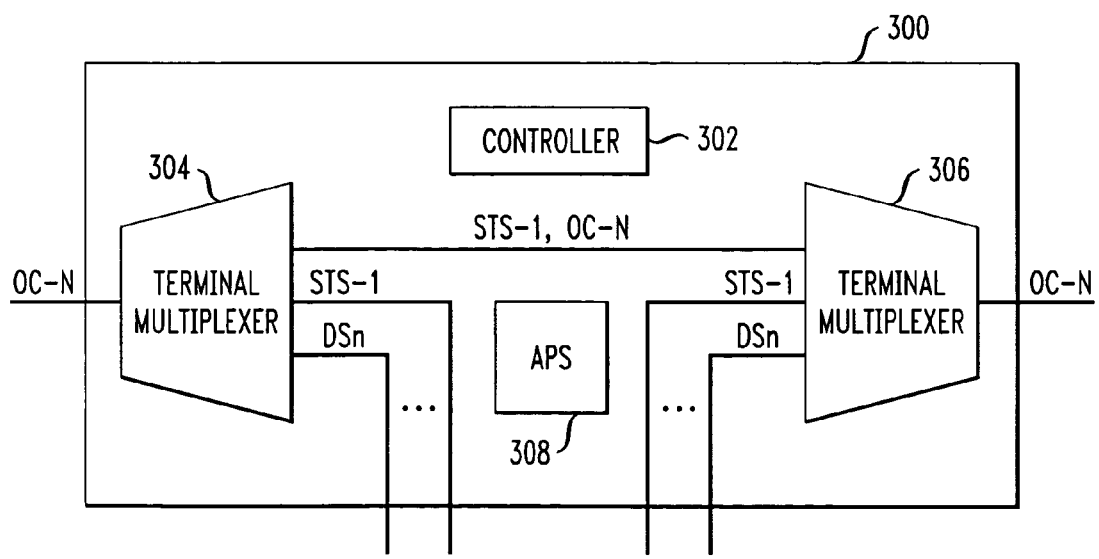
FIG. 3 is a block diagram depicting an exemplary ADM suitable for use in the UPSR shown in FIG. 1.
Figure 2:
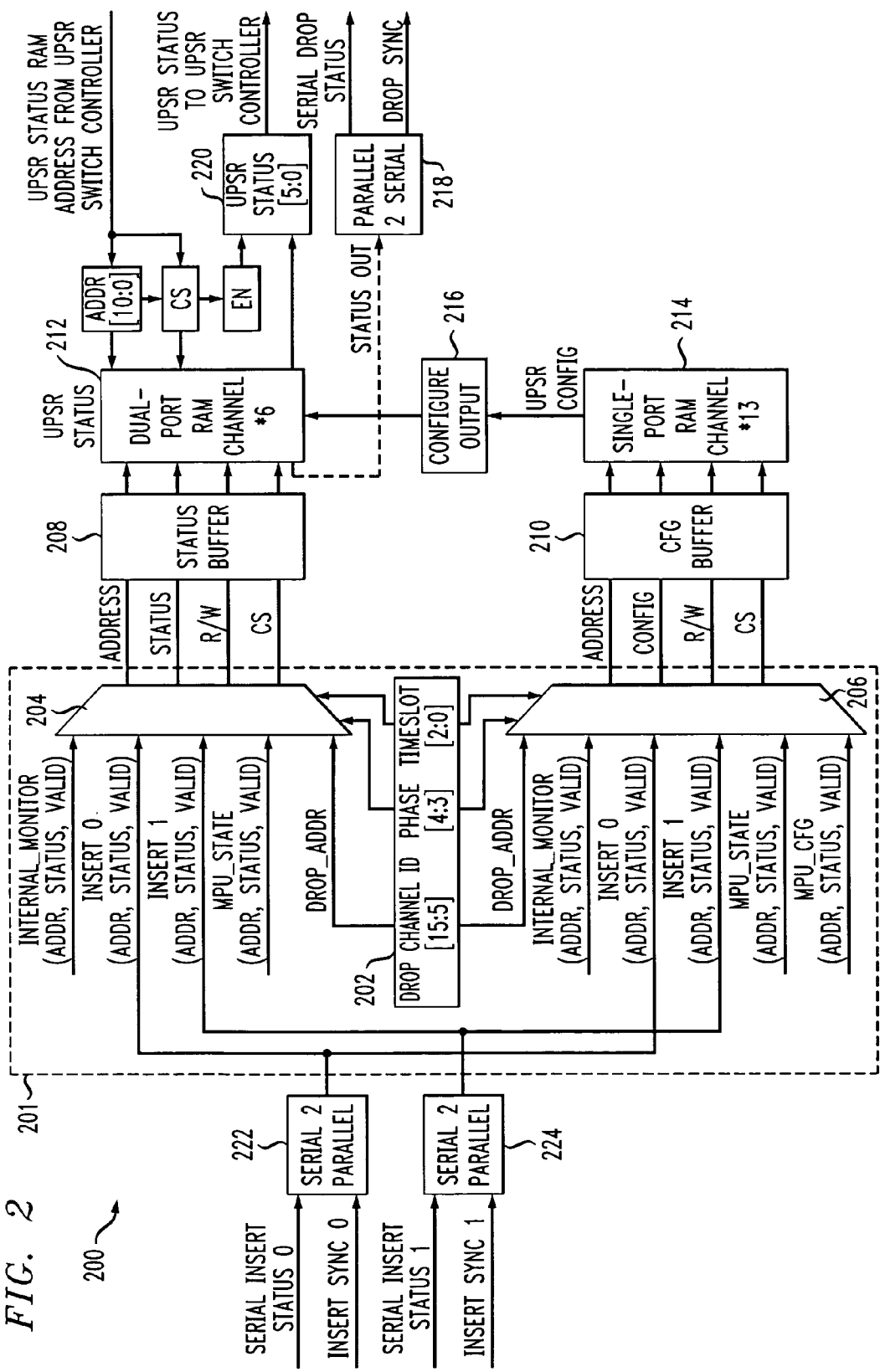
FIG. 2 is a block diagram depicting an illustrative buffer circuit for collecting UPSR status information of all channels in a SONET-based data transport system, in accordance with one embodiment of the present invention.

FIG. 2 depicts a block diagram of an exemplary buffer circuit 200 in which the techniques of the present invention are implemented. At least a portion of the exemplary buffer circuit 200 may be comprised in an ADM (not shown) forming a node in the SONET UPSR. At least a portion of an illustrative ADM 300 in which the techniques of the present invention may be implemented is shown in FIG. 3. The illustrative ADM 300 includes a controller 302, automatic protection switching (APS) circuitry 308, and a pair of terminal multiplexers 304, 306 for signal routing. The buffer circuit 200 is preferably implemented in the APS circuitry 308 of the ADM 300.

In accordance with an illustrative embodiment of the invention, in order to reduce the amount and complexity of hardware required for monitoring UPSR status information of all channels associated with a given signal (e.g., OC-48), the buffer circuit 200 is preferably operative to collect the UPSR status information not merely from internal POH monitors in the ADM (e.g., in controller 302), as is traditionally done, but also from other UPSR status sources, including, but not limited to, external monitors (e.g., one or more FPGAs, another buffer circuit like buffer circuit 200, etc.), an MPU interface, etc., as will be explained in further detail below. The UPSR status information of all channels can be obtained from these other sources either in addition to the internal POH monitors or in substitution for the internal POH monitors.

It is to be appreciated that although the buffer circuit 200 is preferably employed in the VT level of the UPSR, the techniques of the present invention described herein may be similarly utilized in other levels of the network architecture, such as, for example, a tributary unit (TU) level or an administrative unit (AU) level, as will become apparent to those skilled in the art. Utilizing the buffer circuit 200 in the VT level of the UPSR is preferred primarily because the VT level typically has a higher number of channels compared to other levels (e.g., TU or AU), and thus the buffer circuit can achieve a more beneficial reduction in the amount of hardware needed to monitor the UPSR status of all channels. As the number of channels to be monitored increases, the advantages of the buffer circuit 200 become even more evident.

Buffer circuit 200 is preferably configured for obtaining UPSR status information, such as, for example, alarm indication signal (AIS), loss of pointer (LOP), unequipped (UNEQ), remote failure indicator (RFI), trace identifier mismatch (TIM) and bit error rate signal fail/signal degrade (SF/SD), of each of the channels (e.g., TU-3/TU-11/TU-12) associated with a given signal (e.g., OC-48) in the UPSR. The UPSR status information is generally provided as part of the APS capabilities of the SONET protocol, as set forth, for example, in ANSI T1.105.01-2000. The buffer circuit 200 preferably includes a controller 201 comprising a timer 202, or alternative timing circuitry, and first and second multiplexers 204 and 206, respectively, or alternative selection circuitry. The illustrative buffer circuit 200 further includes a status buffer 208, a configuration buffer 210, a dual-port status random access memory (RAM) 212, a single-port configuration RAM 214, a configuration output buffer 216, a serial drop port 218, a UPSR status register 220, first and second serial insertion ports 222 and 224, respectively, and other interface logic circuitry as may be required depending on the particular application in which the buffer circuit 200 is employed. It is to be appreciated that the buffer circuit 200 is not limited to the specific arrangement shown. Rather, alternative circuit arrangements for implementing the techniques of the present invention are similarly contemplated, as will become apparent to those skilled in the art. For example, the buffer circuit 200 is not limited to the particular number of serial insertion ports 222, 224 and/or serial drop ports 218 shown.

Figure 4:
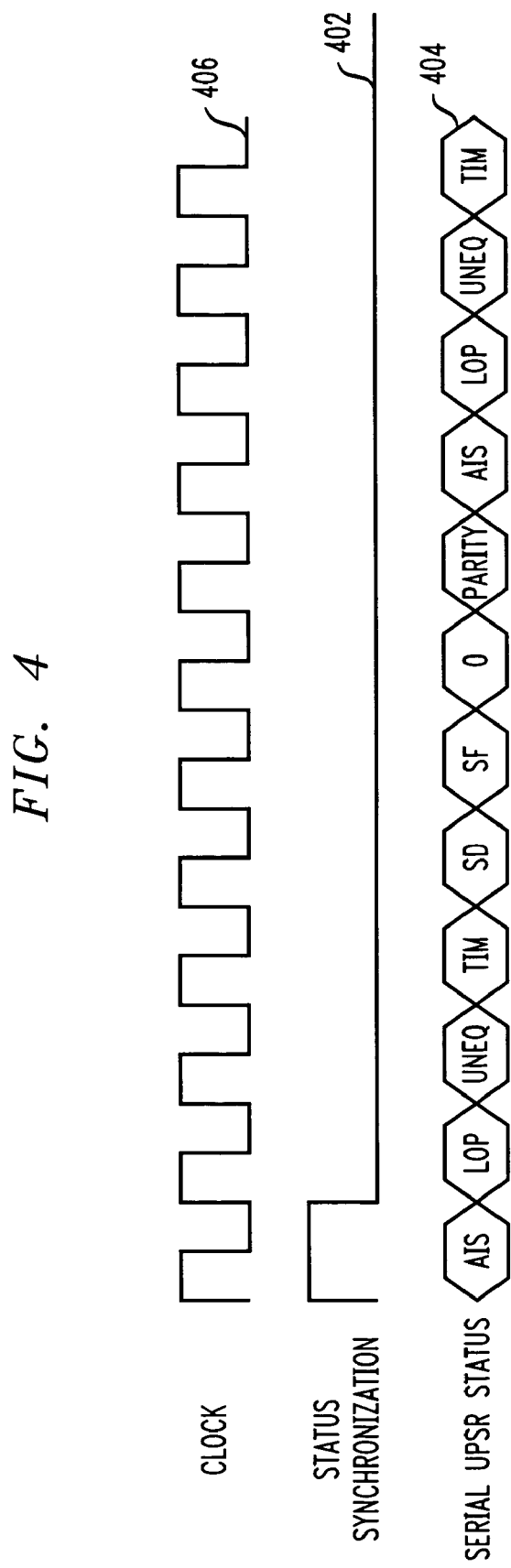
FIG. 4 is a logic timing diagram depicting exemplary signals associated with a serial insertion port which may be employed in the exemplary buffer circuit shown in FIG. 2.

Each of the serial insertion ports 222, 224 is preferably configured for receiving a serial insertion status signal, namely, Serial Insert Status 0 or Serial Insert Status 1, respectively, and a status synchronization signal, namely, Insert Sync 0 or Insert Sync 1, respectively. Each pair of signals, Serial Insert Status n and Insert Sync n, where n is a positive integer, presented to corresponding serial insertion ports 222, 224, is preferably generated by an external monitor, such as, for example, an FPGA, another buffer circuit similar to buffer circuit 200, etc. As illustrated in FIG. 4, the status synchronization signal 402 is used to mark the beginning of a frame of serial data, while the serial insertion status signal 404 provides serial UPSR status bits, including, for example, AIS, LOP, UNEQ, TIM, SD and SF, as well as other bits (e.g., Parity) which may be used for framing, error correction, etc. Each UPSR status bit is synchronized to a given cycle of clock signal 406 provided to the serial insertion ports 222, 224.

With continued reference to FIG. 2, the serial insertion ports 222, 224 preferably generate parallel output signals, Insert 0 (addr, status, valid) and Insert 1 (addr, status, valid), respectively, where the parameter addr represents an address of the LPSR status RAM, the parameter status represents respective logic states of the LPSR status bits (e.g., AIS, LOP, UNEQ, TIM, SD and SF), and the parameter valid is a flag representing whether or not the status information in the received UPSR status bits is valid (e.g., valid being a logic "1" means the status information is valid). Each serial insertion port 222, 224 preferably comprises a serial-to-parallel converter, or alternative conversion circuitry. The serial drop port 218 preferably comprises a parallel-to-serial converter, or alternative conversion circuitry. Serial drop port 218 is configured to receive parallel UPSR status information (e.g., from dual-port RAM 212) and to generate, as outputs, a serial status signal, Serial Drop Status, and a corresponding synchronization signal, Drop Sync.

The output signals Serial Drop Status and Drop Sync may be supplied as inputs, for example, to another buffer circuit (e.g., similar to buffer circuit 200), or they may be used by another device (e.g., MPU, etc.) to serially read out the UPSR status information. UPSR status information may also be read out in parallel using the UPSR status register 220, which may be supplied to, for example, a UPSR switch controller (not shown), or an alternative device, external to the buffer circuit 200. The use of serial insertion ports 222, 224 and serial drop port 218, while optional, is preferred in order to reduce the number of external connections required by the buffer circuit 200.

Controller 201 is preferably configured to receive UPSR status information from a plurality of different status sources (e.g., internal POH monitors, external FPGAs, MPU interface, etc.), and to selectively store the UPSR status of all of the channels in the UPSR status RAM 212 and UPSR configuration RAM 214. First and second multiplexers 204, 206 in the controller 201 are preferably operative to receive the UPSR status information from the plurality of sources, and to selectively output such status information, in response to one or more control signals generated by the timer 202, to corresponding buffers 208, 210. First multiplexer 204 preferably generates an address signal (Address), a UPSR status signal (Status), a read/write signal (R/W), and a chip select signal (CS), in response to one or more control signals provided to the first multiplexer, for selectively writing the UPSR status information of all channels into corresponding status buffer 208. Likewise, in response to one or more control signals, second multiplexer 206 preferably generates an address signal (Address), a UPSR configuration signal (Config), a read/write signal (R/W), and a chip select signal (CS), for selectively writing the UPSR configuration information of all channels into corresponding configuration buffer 210.

By way of example only, first and second multiplexers 204, 206 are preferably operative to receive UPSR status signals Internal_Monitor (addr, status, valid), Insert 0 (addr, status, valid), Insert 1 (addr, status, valid), and MPU_State (addr, status, valid), where, as previously stated, the parameter addr represents the address of the UPSR status RAM, the parameter status represents the logic states of the UPSR status bytes (e.g., AIS, LOP, UNEQ, TIM, SD and SF), and the parameter valid is a flag representing whether or not the received UPSR status information is valid. The signal Internal_Monitor (addr, status, valid) may be generated from standard internal POH monitors, the signals Insert 0 (addr, status, valid) and Insert 1 (addr, status, valid) provided by the serial insertion ports 222, 224, respectively, include status information generated by external POH monitors (e.g., FPGAs), and the signal MPU_State (addr, status, valid) is generated by the MPU interface associated with the ADM in which at least a portion of the buffer circuit 200 may reside.

Timer 202 preferably comprises one or more binary counters, each counter and/or portion of a counter generating one of the control signals for controlling the multiplexers 204, 206, and thereby selecting which one of the UPSR status sources will be supplied to the corresponding buffers 208, 210. In accordance with a preferred embodiment of the invention, timer 202 includes an 1-bit channel counter (Drop_channel_id [15:5]), a 2-bit phase counter (Phase [4:3]), and a 3-bit timeslot counter (TimeSlot [2:0]). It is to be appreciated that timer 202 may alternatively be implemented as a single 16-bit counter, with the most significant bits (MSB), namely, bits 15 through 5, forming the channel number, the next two lower bits, namely, bits 4 and 3, forming the phase number, and the least significant bits (LSB), namely, bits 2 through 0, forming the timeslot number. Each of the counters can be implemented in a conventional manner, such as, for example, by cascading a plurality of D-type flip-flops, or by using an adder and a register, as will be known by those skilled in the art.

The channel counter is preferably configured to count circularly from 0 to 1343, or vice versa, thereby keeping track of each of the 1344 channels associated with a given OC-48 signal. The signal, DROP_Addr, generated as an output of the channel counter, is essentially used as an address for identifying a given one of the channels, such that the channel having a channel number equal to DROP_Addr can access the UPSR status RAM 212 and UPSR configuration RAM 214. The channel counter may be modified accordingly to correspond to the appropriate number of channels to be monitored. For example, in applications requiring the status of more than 2048 channels (e.g., an OC-192 signal), the channel counter may comprise additional bits (e.g., 13 bits, in the case of an OC-192 signal). The phase counter is preferably configured to count circularly from 0 to 3, or vice versa. The phase counter generates a two-bit first control signal, Phase, which functions primarily to identify one of four timing phases in which the buffer circuit 200 may operate, as will be described in further detail below in conjunction with FIG. 5. The timeslot counter is preferably configured to count circularly from 0 to 6, or vice versa. The timeslot counter generates a three-bit second control signal, TimeSlot, which functions primarily to identify which one of seven timeslots the buffer circuit 200 is in at a given point in time.

In the exemplary timer 202, the signal TimeSlot is incremented by one every clock cycle until a maximum count of 6 is reached, at which point TimeSlot is reset to zero and the count begins again. The signal Phase is incremented by one, until a maximum count of 3 is reached, whenever the signal TimeSlot is equal to 6. When Phase reaches its maximum count, it is reset to zero and begins counting up again. Likewise, the signal Drop_Addr is incremented by one whenever Phase is equal to 3, until a maximum count of 1343 is reached. When Drop_Addr reaches its maximum count, it is reset to zero and begins counting up again. It is to be appreciated that the present invention is not limited to this or any particular arrangement of the timer 202. For example, the counters in the timer 202 may be configured to count down rather than up, or to count up or down by a certain number (e.g., by two).

FIG. 5 is an exemplary timing diagram depicting an operation of the illustrative buffer circuit of FIG. 2, in accordance with a preferred embodiment of the invention. As stated above, operation of the buffer circuit 200 may be organized into four distinct phases, namely, Phase 0, Phase 1, Phase 2 and Phase 3, which repeat in a circular manner (e.g., Phase 0 to Phase 1 to Phase 2 to Phase 3 to Phase 4 to Phase 0, and so on). Likewise, each of the four phases may be further divided into 7 timeslots, numbered 0 through 6, which repeat in a circular manner (e.g., 0 to 1 to 2 to 3 to 4 to 5 to 6 to 0, and so on). Each timeslot corresponds to a clock cycle in the buffer circuit 200. It is to be understood that the timing organization depicted in FIG. 5 is merely illustrative, and that alternative timing arrangements suitable for use with the present invention are similarly contemplated, as will become apparent to those skilled in the art. For example, the buffer circuit may be configurable for receiving status information from additional status sources. Accordingly, the timer 202 may be operational in more than four phases and/or more than seven timeslots, so as to allow each of the plurality of status sources time to supply UPSR status information to the status RAM 212 and configuration RAM 214.

The UPSR status sources (e.g., internal POH monitor, MPU interface, external POH monitor, etc.) and drop enable of each channel are configured in the UPSR configuration RAM 214. Each UPSR status source can preferably access the UPSR status RAM 212 in a different timeslot if permitted by the corresponding configuration parameter in the UPSR configuration RAM 214. Preferably, the buffer circuit 200 is configured such that internal POH monitors and the MPU interface sources will supply UPSR status every phase, and serial insertion/drop ports (e.g., 222, 224, 218) will supply/get UPSR status every four phases.

By way of example only, and without loss of generality, operation of the illustrative buffer circuit 200 will now be described, with reference to FIGS. 2 and 5. In Phase 0, when the internal POH monitor (Internal Monitor) wants to supply UPSR status information to the UPSR status RAM 212, it will read the UPSR configuration RAM 214 at timeslot 2 to obtain a corresponding UPSR configuration address. The UPSR configuration data corresponding to the configuration address can then be read from the UPSR configuration RAM 214 at timeslot 3. If permitted based on the configuration data, the UPSR status information from the internal POH monitor will be written into the UPSR status RAM 212 at timeslot 4. When the MPU interface (MPU) wants to supply UPSR status information to the UPSR status RAM 212, it will read the UPSR configuration RAM 214 at timeslot 4, then the configuration data can be read out at timeslot 5. If permitted based on the configuration data, the UPSR status information from the MPU interface will be written into the UPSR status RAM 212 at timeslot 6.

Likewise, when the first serial insertion port 222 (Insert 0) wants to supply UPSR status information to the UPSR status RAM 212, it will read the UPSR configuration RAM 214 at timeslot 0 of Phase 1 to obtain a corresponding UPSR configuration address. The UPSR configuration data corresponding to the configuration address can then be read from the UPSR configuration RAM 214 at timeslot 1 of Phase 1. If permitted based on the configuration data, the UPSR status information from the first serial insertion port 222 will be written into the UPSR status RAM 212 at timeslot 2 of Phase 1. When the second serial insertion port 224 (Insert 1) wants to supply UPSR status information to the UPSR status RAM 212, it will read the UPSR configuration RAM 214 at timeslot 0 of Phase 2, then the configuration data can be read out at timeslot 1 of Phase 2. If permitted based on the configuration data, the UPSR status information from the MPU interface will be written into the UPSR status RAM 212 at timeslot 3 of Phase 2.

When the serial drop port 218 (Drop) wants to get UPSR status from the UPSR status RAM 212, it will read the UPSR configuration RAM 214 at timeslot 0 of Phase 3 to obtain a corresponding UPSR configuration address. The UPSR configuration data corresponding to the configuration address can then be read from the UPSR configuration RAM 214 at timeslot 1 of Phase 3. If permitted based on the configuration data, the UPSR status information will be read from the UPSR status RAM 212 at timeslot 2 of Phase 3 and transmitted by the serial drop port 218 to a device requesting UPSR status information. When it is necessary to configure (Cfg-MPU) the UPSR status sources into the UPSR configuration RAM 214, the MPU associated with the buffer circuit 200 can write the UPSR configuration RAM directly at timeslot 6 of every phase. The configuration data may be at least temporarily held in the configuration output buffer 216 until the UPSR status RAM 212 is ready to receive the configuration data.

As apparent from the figure, UPSR status information and/or UPSR configuration status may not be accessible during each timeslot in a given phase. One or more timeslots, such as, for example, timeslots 502, may be blank. During these timeslots 502, the buffer circuit does not perform any operation directed to providing UPSR status information. These timeslots 502 may be reserved for further utilization and/or other functions (e.g., wait states, system diagnostics, etc.).

The buffer circuit 200 is preferably configured such that the UPSR status can be accessed in an arbitrary sequence by a UPSR switch controller, or alternative external device, associated with the SONET node. In order to accomplish this, the UPSR status RAM 212 preferably comprises a dual-port RAM. A width of the UPSR status RAM 212 is preferably six bits, although the invention is not limited to any particular memory width. The dual-port RAM arrangement allows simultaneous reading and writing of the UPSR status information, and is thus advantageous. However, an access conflict may occur when, for example, the UPSR switch controller attempts to read UPSR status information from the UPSR status RAM 212 at the same time and at the same address as the timer 202 attempts to write UPSR status information in the status buffer 208 to the UPSR status RAM. Since the UPSR configuration need not be accessed by an external device, the UPSR configuration RAM 214 preferably comprises a single-port RAM. A width of the UPSR configuration RAM is preferably 13 bits, although, like the UPSR status RAM 212, the invention is not limited to any particular memory width.

In order to resolve the potential for access conflicts occurring in the UPSR status RAM 212, the buffer circuit 200 is preferably configured such that the UPSR switch controller has a higher priority for reading the UPSR status information from the UPSR status RAM than the buffer has for writing the UPSR status information to the status RAM. When the UPSR status monitors (e.g., internal POH monitor, MPU interface, external monitors, etc.) request to write UPSR status information to the same address and at the same time as the UPSR switch controller requests to read the UPSR status information from the UPSR status RAM 212, the write operation will be forbidden. In order to insure that the status information gets stored in the status RAM, the write operation can be delayed for one clock cycle. In a preferred methodology, the buffer circuit 200 is operative to perform two (or more) consecutive write operations once an access conflict is detected, so as to insure that the UPSR status information will be written at least one of the times. If multiple consecutive read operations of the same address are also requested, only the first read operation will be allowed, and the subsequent read accesses will retrieve the UPSR status information from the output of the UPSR status register 220 directly.

The techniques of the present invention, as set forth herein, provide a cost-effective mechanism for obtaining the status of all channels associated with a given signal in a network-based data transport architecture. Such status information can be obtained from a plurality of status sources, both internal and external to the network node. In this manner, the complexity of the hardware and/or software required for transporting data through the network-based communication system can be significantly reduced, thereby providing a beneficial cost savings.

At least a portion of the exemplary buffer circuit of the present invention may be implemented in one or more integrated circuits. In forming integrated circuits, a plurality of identical die are typically fabricated in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A buffer circuit for use in a node in a network-based data transport system, the buffer circuit being configurable for providing channel status information of substantially all of a plurality of channels associated with a given signal in the network-based data transport system, the buffer circuit comprising:
    a memory; and
    a controller coupled to the memory, the controller being operative: (i) to receive channel status information from a plurality of different channel status sources; (ii) to select one of the plurality of channel status sources for supplying the channel status information at a given point in time; and (iii) to store the channel status information corresponding to the selected channel status source in the memory;
    wherein the plurality of channel status sources comprises at least a first channel status source and a second channel status source, the first channel status source comprising at least one internal monitor and the second channel status source comprising at least one of an external monitor and a processor interface associated with the circuit.

2. The circuit of claim 1, wherein the controller comprises:
    a selection circuit connectable to the plurality of channel status sources and being operative to selectively couple one of the plurality of status sources to the memory in response to at least one control signal; and
    a timer operative to generate the at least one control signal presented to the selection circuit.

3. A buffer circuit for use in a node in a network-based data transport system, the buffer circuit being configurable for providing channel status information of substantially all channels associated with a given signal in the network-based data transport system, the buffer circuit comprising:
    a memory; and
    a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;
    wherein the plurality of channel status sources comprises at least one internal monitor and at least one of an external monitor and a processor interface associated with the circuit;
    wherein the controller comprises:
    a selection circuit connectable to the plurality of channel status sources and being operative to selectively couple one of the plurality of status sources to the memory in response to at least one control signal; and a timer operative to generate the at least one control signal presented to the selection circuit; and wherein the selection circuit comprises at least one multiplexer including a plurality of inputs coupled to respective channel status sources, at least one control input for receiving the at least one control signal, and an output coupled to the memory.

4. The circuit of claim 2, wherein the timer comprises at least one counter operative to generate a channel identifier for each of the substantially all channels for which channel status information is provided.

5. A buffer circuit for use in a node in a network-based data transport system, the buffer circuit being configurable for providing channel status information of substantially all channels associated with a given signal in the network-based data transport system, the buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the controller comprises:

a selection circuit connectable to the plurality of channel status sources and being operative to selectively couple one of the plurality of status sources to the memory in response to at least one control signal; and a timer operative to generate the at least one control signal presented to the selection circuit; and wherein the controller is operative in a plurality of timing phases, each of the timing phases including a plurality of timeslots associated therewith, and wherein the timer comprises at least one counter, at least a first portion of the counter being operative to generate a timeslot number, at least a second portion of the counter being operative to generate a timing phase number, and at least a third portion of the counter being operative to generate a channel number.

6. A buffer circuit for use in a node in a network-based data transport system, the buffer circuit being configurable for providing channel status information of substantially all channels associated with a given signal in the network-based data transport system, the buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the controller comprises:

a selection circuit connectable to the plurality of channel status sources and being operative to selectively couple one of the plurality of status sources to the memory in response to at least one control signal; and a timer operative to generate the at least one control signal presented to the selection circuit; and wherein the controller is operative in a plurality of timing phases, each of the timing phases including a plurality of timeslots associated therewith, and wherein the timer comprises a first counter operative to generate a timeslot number, a second counter operative to generate a timing phase number, and at least a third counter operative to generate a channel number.

7. The circuit of claim 1, further comprising at least one serial-to-parallel converter operative to receive a serial status signal including channel status information from a status source external to the buffer circuit and to convert the serial status signal to a parallel status signal, the parallel status signal being presented to the controller.

8. The circuit of claim 1, further comprising at least one parallel-to-serial converter operative to receive a parallel status signal including channel status information from the memory and to generate, from the parallel status signal, a serial status signal and a corresponding synchronization signal.

9. The circuit of claim 1, further comprising a status buffer coupled between the controller and the memory for at least temporarily storing the channel status information corresponding to at least one of the channel status sources.

10. The circuit of claim 1, wherein the memory comprises a channel status register for storing the channel status information corresponding to the plurality of channel status sources, and a configuration register for storing configuration data corresponding to the plurality of channel status sources.

11. The circuit of claim 10, wherein the channel status register comprises a dual-port random access memory.

12. A buffer circuit for use in a node in a network-based data transport system, the buffer circuit being configurable for providing channel status information of substantially all channels associated with a given signal in the network-based data transport system, the buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the plurality of channel status sources comprises at least one internal monitor and at least one of an external monitor and a processor interface associated with the circuit;

wherein the memory comprises a channel status register for storing the channel status information corresponding to the plurality of channel status sources, and a configuration register for storing configuration data corresponding to the plurality of channel status sources; and wherein the controller is operative in a plurality of timing phases, each of the timing phases including a plurality of timeslots associated therewith, the channel status information corresponding to the plurality of channel status sources being written to the memory during respective timeslots and phases as a function of the configuration data corresponding to the plurality of channel status sources.

13. The circuit of claim 1, wherein the controller is operative to provide channel status information of substantially all channels in an arbitrary access sequence.

14. A buffer circuit for use in a node in a network-based data transport system, the buffer circuit being configurable for providing channel status information of substantially all channels associated with a given signal in the network-based data transport system, the buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the plurality of channel status sources comprises at least one internal monitor and at least one of an external monitor and a processor interface associated with the circuit; and wherein the controller is operative in a plurality of timing phases, each of the timing phases including a plurality of timeslots associated therewith, the channel status information corresponding to the plurality of status sources being written to the memory during respective timeslots and phases.

15. The circuit of claim 1, wherein the network-based data transport system comprises a synchronous optical network universal path switched ring (UPSR), and the channel status information comprises UPSR status.

16. A buffer circuit for use in a node in a network-based data transport system, the buffer circuit being configurable for providing channel status information of substantially all channels associated with a given signal in the network-based data transport system, the buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the plurality of channel status sources comprises at least one internal monitor and at least one of an external monitor and a processor interface associated with the circuit;

wherein the at least one internal monitor comprises an internal path overhead monitor associated with the circuit.

17. An integrated circuit including at least one buffer circuit configurable for providing channel status information of substantially all of a plurality of channels associated with a given signal in a network-based data transport system, the at least one buffer circuit comprising:

a memory; and a controller coupled to the memory, the controller being operative: (i) to receive channel status information from a plurality of different channel status sources; (ii) to select one of the plurality of channel status sources for supplying the channel status information at a given point in time; and (iii) to store the channel status information corresponding to the selected channel status source in the memory;

wherein the plurality of channel status sources comprises at least a first channel status source and a second channel status source, the first channel status source comprising at least one internal monitor and the second channel status source comprising at least one of an external monitor and a processor interface associated with the circuit.

18. The integrated circuit of claim 17, wherein the controller comprises:

a selection circuit connectable to the plurality of channel status sources and being operative to selectively couple one of the plurality of status sources to the memory in response to at least one control signal; and a timer operative to generate the at least one control signal presented to the selection circuit.

19. An integrated circuit including at least one buffer circuit configurable for providing channel status information of substantially all channels associated with a given signal in a network-based data transport system, the at least one buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the controller comprises:

a selection circuit connectable to the plurality of channel status sources and being operative to selectively couple one of the plurality of status sources to the memory in response to at least one control signal; and a timer operative to generate the at least one control signal presented to the selection circuit; and wherein the controller is operative in a plurality of timing phases, each of the timing phases including a plurality of timeslots associated therewith, and wherein the timer comprises at least one counter, at least a first portion of the counter being operative to generate a timeslot number, at least a second portion of the counter being operative to generate a timing phase number, and at least a third portion of the counter being operative to generate a channel number.

20. An integrated circuit including at least one buffer circuit configurable for providing channel status information of substantially all channels associated with a given signal in a network-based data transport system, the at least one buffer circuit comprising:

a memory; and a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;

wherein the plurality of channel status sources comprises at least one internal monitor and at least one of an external monitor and a processor interface associated with the circuit;

wherein the controller is operative in a plurality of timing phases, each of the timing phases including a plurality of timeslots associated therewith, the channel status information corresponding to the plurality of channel status sources being written to the memory during respective timeslots and phases as a function of configuration data corresponding to the plurality of channel status sources.

21. A network-based data transport system node, comprising:

at least one buffer circuit configurable for providing channel status information of substantially all of a plurality of channels associated with a given signal in a network-based data transport system, the buffer circuit comprising:

a memory; and a controller coupled to the memory, the controller being operative: (i) to receive channel status information from a plurality of different channel status sources; (ii) to select one of the plurality of channel status sources for supplying the channel status information at a given point in time; and (iii) to store the channel status information corresponding to the selected channel status source in the memory;

wherein the plurality of channel status sources comprises at least a first channel status source and a second channel status source, the first channel status source comprising at least one internal monitor and the second channel status source comprising at least one of an external monitor and a processor interface associated with the circuit.

22. The node of claim 21, wherein the controller comprises:
a selection circuit connectable to the plurality of channel status sources and being operative to selectively couple one of the plurality of status sources to the memory in response to at least one control signal; and
a timer operative to generate the at least one control signal presented to the selection circuit.

23. A network-based data transport system node, comprising:
at least one buffer circuit configurable for providing channel status information of substantially all channels associated with a given signal in a network-based data transport system, the buffer circuit comprising:
a memory; and
a controller coupled to the memory, the controller being operative: (i) to receive channel status information from a plurality of different channel status sources; (ii) to select one of the channel status sources for supplying the channel status information at a given point in time; and (iii) to store the channel status information corresponding to the selected channel status source in the memory;
wherein the controller comprises:
a selection circuit connectable to the plurality of channel status sources and being operative to selectively couple one of the plurality of status sources to the memory in response to at least one control signal; and
a timer operative to generate the at least one control signal presented to the selection circuit; and
wherein the controller is operative in a plurality of timing phases, each of the timing phases including a plurality of timeslots associated therewith, and wherein the timer comprises at least one counter, at least a first portion of the counter being operative to generate a timeslot number, at least a second portion of the counter being operative to generate a timing phase number, and at least a third portion of the counter being operative to generate a channel number.

* * * * *